(12) United States Patent
Hager, IV et al.

(10) Patent No.: US 11,072,073 B2
(45) Date of Patent: Jul. 27, 2021

(54) SYSTEM FOR COMMUNICATING AND USING TRAFFIC ANALYSIS IN A SPACE WITH MOVING OBSTACLES

(71) Applicant: DISNEY ENTERPRISES, INC., Burbank, CA (US)

(72) Inventors: Joseph George Hager, IV, Valencia, CA (US); Michael R. Honeck, Glendale, CA (US); Jeremy Andrew Mika, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/871,881

(22) Filed: May 11, 2020

(65) Prior Publication Data
US 2020/0276710 A1    Sep. 3, 2020

Related U.S. Application Data

(63) Continuation of application No. 15/840,643, filed on Dec. 13, 2017, now Pat. No. 10,688,662.

(51) Int. Cl.
*G05B 19/18* (2006.01)
*G05B 15/00* (2006.01)
(Continued)

(52) U.S. Cl.
CPC .......... *B25J 9/1676* (2013.01); *B25J 9/1664* (2013.01); *G05D 1/0214* (2013.01);
(Continued)

(58) Field of Classification Search
CPC ..... B25J 9/1676; B25J 9/1664; G05D 1/0214; G05D 1/0219; G05D 2201/0211; G06T 17/05
See application file for complete search history.

(56) References Cited

U.S. PATENT DOCUMENTS

2004/0098237 A1* 5/2004 Pendergraft ........... G06Q 10/04
703/7
2010/0106356 A1* 4/2010 Trepagnier ............... G08G 1/16
701/25

(Continued)

FOREIGN PATENT DOCUMENTS

CN             106204594        * 12/2016

*Primary Examiner* — Harry Y Oh
*Assistant Examiner* — Sohana Tanju Khayer
(74) *Attorney, Agent, or Firm* — Snell & Wilmer L.L.P.; Kent A. Lembke

(57) ABSTRACT

A system for improving navigation of robots in a space with a plurality of pedestrians or other movable objects or obstacles. The system includes a traffic analysis assembly that has a traffic sensor(s) sensing movement of the obstacles in the space. The traffic analysis assembly further includes a processor running a flow module that processes (such as the Gunnar-Farneback optical flow algorithm) output from the traffic sensor to generate traffic analysis results, which include density values for the obstacles in the space and motion information for the obstacles in the space (e.g., speed and direction). The system includes a robot with a controller running a navigation module selecting a navigation route between a current location of the robot and a target location in the space using the traffic analysis result. The workspace is configured such that the obstacles such as pedestrians have unregulated flow patterns in the space.

17 Claims, 6 Drawing Sheets

(51) Int. Cl.
*B25J 9/16* (2006.01)
*G06T 17/05* (2011.01)
*G05D 1/02* (2020.01)

(52) U.S. Cl.
CPC ........... *G05D 1/0219* (2013.01); *G06T 17/05* (2013.01); *G05D 2201/0211* (2013.01)

(56) References Cited

U.S. PATENT DOCUMENTS

| | | | |
|---|---|---|---|
| 2010/0241289 A1* | 9/2010 | Sandberg | B25J 9/1689 |
| | | | 701/2 |
| 2014/0267734 A1* | 9/2014 | Hart, Jr. | G06K 9/00785 |
| | | | 348/149 |
| 2014/0350725 A1* | 11/2014 | LaFary | G05B 19/4061 |
| | | | 700/253 |
| 2017/0356751 A1* | 12/2017 | Iagnemma | G01C 21/3691 |
| 2018/0018882 A1* | 1/2018 | Joyson | G08G 5/0013 |
| 2018/0174449 A1* | 6/2018 | Nguyen | G08G 1/0104 |
| 2018/0326982 A1* | 11/2018 | Paris | G05D 1/0088 |
| 2018/0329418 A1* | 11/2018 | Baalke | G05D 1/024 |
| 2019/0061166 A1* | 2/2019 | Dai | B25J 9/0084 |

* cited by examiner

SYSTEM FOR COMMUNICATING AND USING TRAFFIC ANALYSIS IN A SPACE WITH MOVING OBSTACLES

CROSS REFERENCE TO RELATED APPLICATIONS

This application is a continuation of U.S. patent application Ser. No. 15/840,643, filed Dec. 13, 2017, which is incorporated herein by reference in its entirety.

BACKGROUND

1. Field of the Description

The present invention relates, in general, to methods and systems for controlling a robot (such as a service or entertainment robot) for safe and efficient navigation in spaces (or "workspaces") with one to many people, either walking or operating bicycles, wheelchairs, mobility scooters, skates, Segway or similar vehicles, and the like (all may be referred to as "obstacles" or "moving objects" or the like), and more particularly, to a robot controller (or assembly for controlling a robot) that is adapted, when navigating a robot through a crowded workspace, to provide efficient control (e.g., the quickest path) in the context of pedestrian traffic in the workspace including choosing between one or more end points/choices (e.g., a targeted second location from a current or first location (or "origin") of the robot) and/or one or more paths to a chosen end point (or "target" or "goal").

2. Relevant Background

Today, robots are widely used in a wide variety of environments including public environments where the robots may need to interact with or at least safely navigate in the presence of people. Human behavior is complex, which makes it difficult to accurately predict what any particular person will do in the future. This is a primary challenge or difficulty in planning robot interactions with people and for navigating a robot through a space (or workspace) that may include a few people or may even be very crowded with people. In some cases, it may be desirable for the robot to interact safely with the people, and it may be desirable for the robot to move safely and efficiently through a workspace without human interaction to reach a targeted destination.

In some traditional applications, robots are used in industrial environments in confined spaces where people may have limited access. More recently, though, service robots have been designed and distributed that are configured to interact with humans. Therefore, safe navigation is becoming a more important challenge for designing such robots and robot controllers, and, as a result, human-aware motion planning has been an increasingly active area of research for those in the robotics industry. One goal of a designer of a motion planner or robot controller for a robot is to generate paths or trajectories in the workspace that are physically and psychologically safe for the humans and also for the robot itself.

In many previous planner design approaches, a scenario is assumed in which the robot interacts with one person or only a few people. Robots are increasingly operating in public spaces such as streets or parks for service and entertainment purposes. In such crowded environments, robots will be required to be aware of multiple humans on an ongoing basis in order to navigate safely. Several prior works have modelled the more crowded situation by considering humans in the workspace to be dynamic obstacles that the robot needs to avoid. Other motion planners have instead computed joint motions among the robot and humans using the assumption that both will act in a cooperative manner as is common in human-to-human interactions in a crowd to avoid blocking each other's travel. These assumptions may be useful in some settings, such as for a service robot that is assisting in people's daily tasks, but these assumptions may be erroneous in other settings, such as for an entertainment-providing robot, where human behavior toward a robot can be much more difficult to predict.

Today, autonomous robots may analyze their environment to determine safe paths for future motion. Advanced controllers (e.g., ones with sophisticated motion planners) may even try to anticipate or predict human motion in their environment and incorporate that data into the navigation solution. However, these advanced controllers only track a small number of individual pedestrians, and these are typically the pedestrians or people that are directly in front of the autonomous agent in the workspace. As a result of these limitations, many of today's robot controllers are not wholly effective in meeting all navigation goals for the autonomous agent including choosing a most efficient or effective path through a crowded workspace.

In this description, the robots are moved through a space that contains one or more obstacles or moving objects that may be considered entities or tracked entities in a particular space, and it is intended that such entities would include people (walking, standing, bicycling, piloting other vehicles, and so on), other robots, autonomous vehicles, unmanned aerial vehicles, remotely or programmatically piloted moving objects, and the like. Also, the term "robot" is used interchangeably with "autonomous agent" and is intended to be construed to include any machine or device that is capable of moving within and/or through a space under control implemented by programmed logic, artificial intelligence, or other machine control terminology that executes at least some navigation decisions without direct human input, and these robots may include service robots, entertainment robots, smart cars, and the like.

SUMMARY

The inventors recognized that conventional motion planners that are used to control many robots (or autonomous agents) only track and predict movement of a very small number of people (or other obstacles, moving objects, entities, or tracked entities herein) in their present space, and these tracked people are often the ones immediately in their present path. Hence, in densely crowded spaces such as a room or street full of people moving or standing around, the conventional motion planner often will fail (e.g., causing the robot to remain stationary) or will provide information of limited use. Additionally, most existing navigational solutions are limited to predicting human motion from the vantage point of the robot or autonomous agent itself or from a tightly controlled surrounding environment.

However, the inventors understood that, for safe and more efficient and effective navigation in densely crowded situations, it is desirable to know not just the location of the closest individuals or groups of people or other obstacles but, also, the overall density of a crowd or group in a space and an overall direction the crowd or group of obstacles is moving across the workspace. In this case, the space may be a relatively large and uncontrolled region about the robot's current location, e.g., a large room, a street or set of streets, and the like. The problem of how best to navigate a robot through a workspace is a problem that has only very recently presented itself due to the increased use of autonomous agents near and amongst crowds of humans and/or other potential obstacles for the robot, and the following discussion provides a useful technical innovation to address this challenge faced by users of autonomous agents such as robots.

In brief, a system such as a robot operating system is described that includes a traffic analysis unit along with one or more autonomous agents (e.g., mobile robots, driverless vehicles, and the like) that are attempting to move or navigate their way through a space with one or more obstacles such as people, other autonomous agents, movable objects/obstructions, and the like. The space differs from many in that the obstacles, such as people in the space, are generally free to move in any direction and may not have any (or few) restraints to their movements, e.g., a workspace may be designed to have at least some unregulated obstacle movement.

The traffic analysis unit includes one or more traffic sensors positioned in or near the workspace to monitor pedestrian and other obstacle traffic. The traffic analysis unit provides a third-person perspective of the space as well as the ability to sense spaces outside the space that are non-line of sight, distant, occluded, or otherwise difficult to directly sense from the perspective of a robot operating in the space. Each sensor may take the form of a high resolution camera (e.g., a still or video camera with high resolution) in some cases that is used to capture frames for processing while other embodiments may use any available traffic sensor to capture traffic data such as infrared (IR) cameras, LIDAR, ultrasonic sensors, in path sensors (e.g., electromagnetic loops), and the like. A traffic or flow module analyzes each frame and determines traffic data including motion direction and speed along a grid of sample points, and the flow module outputs several results that can be used by a navigation controller (or motion planner) of an autonomous agent to select a route (or course or path) between their current position (origin) and a goal or target location in the workspace. In implementations where the traffic sensor captures two dimensional (2D) data from the sensor that data may be mathematically transformed to represent the three dimensional (3D) physical area of the space, and this transformed representation can be aligned with other map-based systems that are calibrated to a real world coordinate system.

The traffic analysis unit may process the sensed traffic data in a number of ways to provide results/outputs that are useful to a motion planner or navigation module of a robot controller. When multiple objects or pedestrians are detected in close proximity to each other and moving in the same direction, they can be grouped so that an autonomous agent can choose to steer clear of, follow, or move adjacent to the group. For some systems and/or for some spaces, the concept of lanes and zones are used to make the data easier to process by the traffic or flow module. For example, the space or observation area can be split into several zones or areas (or spaces), and the traffic or flow module can be adapted to generate and report out an overall traffic flow direction and speed for each zone. Further, the density of the pedestrians in the workspace or observation area is determined and reported, and the obstacle (e.g., pedestrian) density can be accessed using 3D real world coordinates.

The inventors understood that pedestrian traffic in crowded areas does not always follow a regulated flow pattern, and many groups of people will have paths that crisscross through a workspace, and this is quite different than how automobile traffic moves on regulated streets and highways. The system (and corresponding methods) described herein enables an autonomous agent to comprehend the complex nature of movement in close proximity and to make intelligent choices for navigating in a monitored area. An autonomous agent can use motion and density information to avoid crowded areas (if that is a navigation rule/goal) and make reasonable selections among potential routes when selecting a route or selecting a target or goal location (e.g., by rejecting routes through forcing the autonomous agent to cross a group's path or go upstream of flow, by rejecting target locations that are upstream of a zone/area that has a higher density (is heavily crowded with pedestrians), and the like). If the autonomous agent already has chosen or been assigned a navigation goal, the density and motion information can be used by its motion planner to select the most efficient route to the goal or to abort this navigation goal and to select another (e.g., when two or more target locations are presently acceptable to the autonomous agent such as when the agent is attempting to move to a charging station and can use any available in a workspace).

More particularly, a system is provided for improving navigation of robots in a space with a plurality of obstacles (e.g., moving or movable objects such as, but not limited to pedestrians). The system includes a traffic analysis unit that has a traffic sensor(s) sensing movement of the obstacles in the space. The traffic analysis unit further includes a processor running a flow module that processes (with one or more algorithms such as the Gunnar-Farneback optical flow algorithm) output from the traffic sensor to generate traffic analysis results. These results may include density values for the obstacles in the space and motion information for the obstacles in the space (e.g., speed and direction of individual obstacles and/or groups of such obstacles such as pedestrians). The system also includes, in the space, a robot with a controller running a navigation module to select a navigation route between a current location of the robot and a target location in the workspace based on the traffic analysis result. The space is configured such that the obstacles have unregulated flow patterns in at least one area of the space.

The robot may take the form of a mobile robot or a driverless vehicle in wireless communications with the traffic analysis unit to periodically receive the traffic analysis results. The navigation module may select the navigation route from a set of two or more potential routes based on processing the traffic analysis results in conjunction with a set of navigation constraints. The motion information may include direction and speed of individual ones of the obstacles or of groups of the obstacles, and the set of navigation constraints may call for traveling in a direction matching the direction of the individual ones of the obstacles or of groups of the obstacles, call for traveling at a speed matching the speed of the individual ones of the obstacles or of groups of the obstacles, or call for discarding any of the potential routes that are in a direction opposite the direction of the individual ones of the obstacles or of groups of the obstacles. In other cases, the set of navigation constraints call for discarding any of the potential routes that involve travel through portions of the workspace where the density values exceed a predefined maximum obstacle density.

The traffic sensor may be a digital camera(s), and the output from the traffic sensor may be a sequence of video frames capturing images of the space. The flow module may then process the sequence of video frames to generate the traffic analysis results using the Gunnar-Farneback optical flow algorithm. The traffic analysis unit further may include a traffic data filtering module run by the processor to crop out subsets of each of the video frames to remove data irrelevant to navigation of the robot or to correct for lens positioning in the workspace and distortion. In these or other implementations, the traffic analysis unit further acts to correlate the traffic analysis results to three-dimensional (3D) real world system coordinates corresponding to the workspace prior to delivery to the robot.

The concepts taught herein may also be used to implement systems and methods for collecting, processing, reporting, and using traffic conditions to control and/or modify operations of one-to-many off-board operational assets. In some cases, the remote traffic conditions are gathered through the use of a mobile autonomous agent navigating through a work space or a facility.

More particularly, a method is described herein for reporting remote traffic conditions to off-board operational assets in a facility using a mobile autonomous agent. The method includes navigating a mobile autonomous agent along a navigation route in a facility, and the navigation route may be proximate to a number of moving or movable obstacles (e.g., pedestrians) in the facility. The method also includes, at two or more locations along the navigation route, using a traffic sensor onboard the mobile autonomous agent to sense movement of obstacles in the facility and, in response, generate sensor output. Further, the method includes generating a traffic analysis from the sensor output, and the traffic analysis (or traffic analysis results) may include density values for the obstacles in the facility and motion information for the obstacles in the facility. Additionally, the method includes communicating the traffic analysis from the two or more locations from the mobile autonomous agent to an off-board operational asset in the facility and modifying at least one operation of the off-board operational asset based on the traffic analysis.

In some implementations of the method, the off-board operational asset is located at a fixed location in the facility that is remote from the two or more locations. Further, in such implementations, the at least one modified operation may include modifying staffing at or near the fixed location based on anticipated traffic implied by the traffic analysis. Additionally or alternatively, the at least one modified operation may include opening additional services or closing services at or near the fixed location based on anticipated traffic implied by the traffic analysis. In the same or other implementations, the at least one modified operation may include activating a kiosk in a space proximate to guests in the facility to alter traffic reported by the traffic analysis. In the same or other cases, the at least one modified operation may include modifying operation of one or more people-moving machines in the facility based on anticipated traffic implied by the traffic analysis.

In some embodiments of the method, the off-board operational asset may include a mobile handheld device operated by a guest of the facility and the at least one modified operation may then include modifying a navigation operation directing the guest, using the mobile handheld device, to navigate within the facility. In these or other embodiments, the facility can be configured such that the obstacles have unregulated flow patterns in at least one area of the space and the navigation route passes through the facility between the two or more locations. Further, in some implementations of the method, the mobile autonomous agent is or includes a mobile robot or driverless vehicle in wireless communications with the off-board operational asset to periodically communicate the traffic analysis. The method may be carried out with the motion information including direction and speed of individual ones of the obstacles or of groups of the obstacles. The act of generating a traffic analysis also may include processing the sensor output to generate the traffic analysis using the Gunnar-Farneback optical flow algorithm. Further, the act of generating a traffic analysis may include filtering traffic data to crop out subsets of the sensor output to remove data irrelevant to operation of the off-board operational asset.

The description provided herein also provides a system for communicating traffic analysis in a space with a plurality of obstacles, with the space being configured such that the obstacles have unregulated flow patterns in at least one area of the space. The system includes a mobile traffic analysis unit including a digital camera capturing a sequence of video frames of the space from at least two locations, the sequence of video frames including the obstacles, and the mobile traffic analysis unit further may include a flow module processing the sequence of video frames to generate traffic analysis results including motion information for the obstacles in the space. The system further includes a fixed-location operational asset communicating with the mobile traffic analysis unit to receive the traffic analysis results, and at least one operation of the fixed-location operational asset can be modified based on the traffic analysis results.

In implementing this system, the mobile traffic analysis unit may further include a traffic data filtering module run by a processor to crop out subsets of each of the video frames to remove data associated with areas of the space without navigable pathways for the mobile traffic analysis unit or to correct for lens positioning in the space and distortion and further wherein the motion information comprises direction and speed of groups of the obstacles. In the same or other implementations, the mobile traffic analysis unit may include a mobile robot or driverless vehicle in wireless communications with the fixed-location operational asset to communicate the traffic analysis results from the at least two locations. Further, the mobile traffic analysis unit may operate to process the sequence of video frames to generate the traffic analysis results using the Gunnar-Farneback optical flow algorithm.

DETAILED DESCRIPTION

The following description is directed toward a system in which one or more robots or other autonomous agents, such as mobile robots or the like, are assisted in their navigation through a workspace or simply "space" containing one or more moving or movable obstacles or objects such as people (e.g., pedestrians, people on bicycles, people on Segways, people on scooters, and so on), other robots, automated vehicles, and so on. The obstacles in the workspace are free, at least in some zones or areas, to move in any direction with little or no flow regulation. The system includes a traffic analysis unit that is configured to process sensed traffic data from one or more sensors used to monitor pedestrian presence and activity in the workspace, and this processing includes generating traffic analysis results that include for one or more areas/zones of the workspace the density of the moving/movable obstacles and motion information for the obstacles (e.g., direction and speed for individual obstacles and/or groups of obstacles). The robot includes a controller that runs a motion planner or a navigation module that takes the traffic analysis results as input and, based on a set of course/route selection rules, acts to select a route through the workspace and obstacles (such as, but not limited to, pedestrians) to a navigational goal or target location (which may be selected from a set of possible target locations to better suit the traffic of the moving/movable obstacles).

Autonomous agents, including robots and driverless vehicles, generally scan the areas immediately around them to determine viable paths that can be used for safe navigation. While this navigational method may work for navigating the immediate area, autonomous agents may need to have an awareness of obstacles that are out of the range of the onboard sensors and/or areas that are occluded by walls and other objects. By operating the traffic analysis unit to determine and then provide obstacle flow (or traffic) data to the autonomous agent, the autonomous agent can choose to take a path, not take a path, or take a path but only in one direction (e.g., in the direction of a group of obstacles in the workspace are moving or with the flow of existing movement in the workspace).

Figure 1:
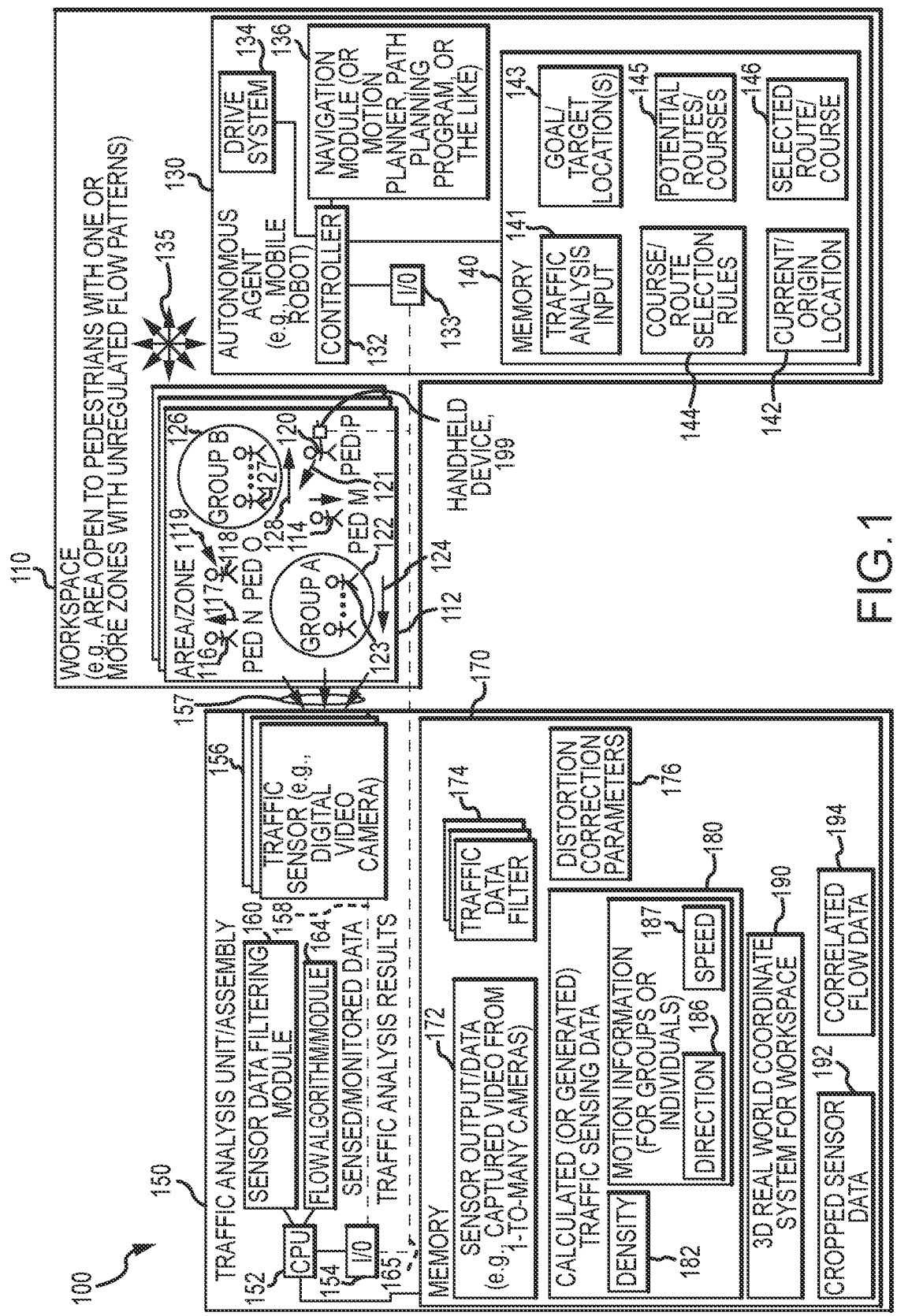
FIG. 1 is a schematic or functional block drawing of a system (e.g., a robot operation system) with a traffic analysis unit providing traffic analysis results to one or more autonomous agents (e.g., mobile robots, driverless vehicles, and the like) for use in navigating through a space with one or more movable/moving obstacles or objects such as pedestrians.

FIG. 1 is a schematic or functional block drawing of a system (e.g., a robot operation system) 100 with a traffic analysis unit 150 providing traffic analysis results 165 to one or more robots or autonomous agents (e.g., mobile robots, driverless vehicles, and the like) 130 for use in navigating through a space 110 with one or more obstacles 114, 116, 118, 120, 123, 127 (with pedestrians being shown in FIG. 1 as one useful but non-limiting example). The space 110 may take nearly any form as it is an area or space that is open to movable/moving obstacles such as pedestrians and that, typically, includes one or more areas/zones with unregulated flow patterns, which means the obstacles can move in nearly any direction in the space 110 over time. Hence, it is desirable to monitor and determine flow patterns and other information about the obstacle (e.g., pedestrian) traffic in the space 110 to facilitate navigation of the robot 130 throughout the space 110 (not just in its immediate vicinity but from an origin to a goal or target location that may be outside the range of the robot's sensors or be obstructed from the sensors' "view" at a particular point in the navigation process).

As shown, the space 110 includes one-to-many areas/zones 112, and the traffic analysis unit 150 may be configured to divide the space 110 into the zones 112 to simplify traffic analysis or the zones 112 may be predefined for the space 110, with definitions stored in memory 170 for later use. For example, one zone 112 may be a pedestrian walkway between two buildings/facilities while another zone 112 may be a display or attraction area, and the traffic in the first zone may have greater speeds and one of two directions while the traffic in the second zone may be much more unpredictable with pedestrians and other obstacles sometimes being stationary (or moving with no or at low speed) and with apparently random movements (milling about the zone to enjoy the display/attraction). In each area/zone 112, there may be numerous moving/movable obstacles, each with a freedom of motion.

For example, the illustrated zone 112, includes: a first pedestrian/obstacle 114 moving in a first direction at a first speed (shown by arrow 115); a second pedestrian/obstacle 116 moving in a second direction at a second speed (shown by arrow 117) that may differ from the first pedestrian/obstacle 114; a third pedestrian/obstacle 118 moving in a third direction at a third speed (shown by arrow 119) that may differ or be the same as the other pedestrians/obstacles; a fourth pedestrian/obstacle 120 moving in a fourth direction at a fourth speed (shown by arrow 121) that may differ or be the same as the other pedestrians/obstacles; a first group/set 122 of pedestrians/obstacles 123 moving in a first group direction at a first group speed (shown by arrow 124, and the traffic analysis unit 150 may be configured to group pedestrians/obstacles 123 that are determined to be in close proximity (e.g., less than 3 feet in some embodiments) and generally moving in a single direction (e.g., directional vector within about 15 degrees or the like)); and a second group/set 126 of pedestrians/obstacles 127 moving in a second group direction at a second group speed (shown by arrow 128, which may differ or be the same as the first group 122). As can be seen with this simple example, the flow patterns are not fixed or regular in the area/zone 112 of the workspace 110 as speeds and directions may vary for individual pedestrians/obstacles and groups of pedestrians/obstacles. Throughout the space 110 and in each zone 112, the density of the obstacles may also vary, and real world applications often will include many more obstacles than shown in the example of FIG. 1 (e.g., spectators moving about a ballpark, shoppers moving through a mall, viewers of a parade moving along a parade route, and the like).

It may be desirable during operations of the system 100 for the robot 130 to be able to move (as shown with arrows 135) in one or more direction along a route, path, or course to move through the areas/zones 112 (or to avoid particular areas/zones 112 due to traffic analysis results 165) and through the obstacles (e.g., pedestrians or the other movable and/or moving objects). To this end, the autonomous agent (e.g., a robot) 130 receives as input the traffic analysis results 165 from the traffic analysis unit 150 and processes this data to select a proper route/course 146 between its current/origin location 142 in the space 110 and a goal/target location 143 (which may also be chosen based on the results 165). In other embodiments, these navigational decisions are also performed offboard (rather than onboard as shown), and the target location 143 and route 146 are provided to the robot 130 that uses its onboard sensors to attempt to safely navigate along the route/course 146.

As shown, the robot 130 includes a controller (e.g., a processor and/or software) 132 that issues control signals to a drive system 134 to cause the robot 130 to move 135 through the space 110. The robot 130 also includes input/output (I/O) devices 133 for receiving (e.g., via a wireless transceiver) the traffic analysis results 165 from the traffic analysis unit 150 on an ongoing/periodic basis. The robot 130 includes memory 140 that stores this traffic analysis input 141, and the controller 132 executes code or runs a software program to provide the functionality of an onboard navigation module 136 (which may include or be a motion planner).

The navigation module 136 processes the traffic analysis input 141 in light of a set of course/route selection rules 144 (stored in memory 140) to choose a route/course 146 through the space 110. Typically, the robot 130 has sensors or other devices for determining its current location (or its origin location) 142 in the workspace 110. The navigation module 136 may generate one or more goal/target locations 143 (or these may be fed to the robot 130 by an offboard controller such as unit 150 or another controller of robots 130 in the workspace 110) and then generate one or more potential routes/courses 145 for traveling through the workspace 110 between the origin location 142 and the goal location 143.

The course/route selection rules (and/or goal/target location selection rules) 144 may vary to practice the system 100 but may call for the selected route 146 (or location 143) to be the one with a shortest travel time based on the traffic analysis results 165. In some cases, the rules 144 may call for the navigation module 136 to avoid areas/zones 112 with a density over a particular preset value. The rules 144 may call for routes/course 145 to be evaluated to choose one which allows the robot 130 to "go with the flow" by moving in the same direction as the traffic (e.g., move with or adjacent to group 122 in area/zone 112) or to "avoid dense flow" such as by moving through areas with single-to-few pedestrians or other obstacles (lower pedestrian density values) and no or few groups of obstacles 122, 126. In some embodiments, the robot 130 may be operated to achieve other goals than mere efficient movement through a space 110 such as to change traffic flow by moving into an area of low density to attract people or other obstacles into this lower density and/or lower traffic flow area in the workspace 110 (e.g., the robot 110 may be a robot configured to entertain or attract pedestrians and other people), and this may be useful to reduce congestion in particular portions of an area/zone 112 or encourage people to observe or experience a particular aspect of the space 110. In some embodiments, the rules 144 may cause the navigation module 136 to discard any target location 143 that is located within a portion of the space 110 with pedestrian (or other obstacle) density over a predefined value or with such a densely populated area between the origin and target locations.

The traffic analysis unit 150 includes a processor 152 that manages a set of I/O devices 154 for communicating (wired or wirelessly) with the robot 130 as shown at 165 to provide the traffic analysis results 165. Also, the processor 152 manages access to memory or data storage 170. The processor 152 executes code or runs software routines/programs (e.g., stored in memory 170) to provide the functionality of a sensor data filtering module 160 and a flow algorithm 164, which generates a set of traffic sensing data 180 and a set of correlated flow data 194 that may be included in the traffic analysis results 165 sent to the robot 130. As the basis for the results 165, the processor 152 stores sensor output/data 172 from one-to-many traffic sensors 156, and this data 172 is processed by the filtering module 160 and the flow algorithm 164.

In one embodiment, each traffic sensor 156 takes the form of a digital video camera 156 directed into (or focused upon) a portion of the workspace 110 to sense (as shown with arrows 157) the presence and movements of obstacles for the robot such as people on/in vehicles and/or pedestrians. In such cases, the sensor output/data 172 may take the form of captured video (or frames) from the digital video cameras 156. Specifically, high resolution (e.g., red-green-blue (RGB)) cameras 156 may be placed into an environment (or location within or near the space 110). The cameras 156 can cover a large area/space 110, and the output 172 can be divided by the traffic analysis unit 150 (such as with filtering module 160) into areas/zones 112 that represent spaces that may include or provide various potential paths that the autonomous agent 130 can use for its navigation in the space 110.

The filtering module 160 may function to apply a series of traffic data filters 174 to the video frames/sensor output 172, and the filters 174 may be configured so as to reduce or eliminate portions of the space 110 such that analysis is only required for zones/areas 112. To this end, one or more of the filters 174 may be a cropping filter designed to eliminate portions of the space 110 while retaining the zones 112 such as by defining portions/areas of the space 110 that do not include pathways that are navigable by the robot 130 or that are designated as off limits for the robot 130 by operators of the space 110. This will reduce the areas 112 that have to be analyzed, which lowers the computational overhead of the flow solver/algorithm 164 (e.g., improves performance of the traffic analysis unit/assembly 150). For example, the robot 130 may only travel on sidewalks, streets, pathways, floors, and the like in the space 110, and other areas captured in the video frames can be cropped (e.g., crop out building roofs, eliminate landscaped areas, remove water-covered areas/fountains, and so on). The filters 174 applied by the filtering module 160 may also include a filter for providing brightness and/or contrast correction. The memory 170 is also shown to include distortion correction parameters (or filters) 176, and the filtering module 160 may use these parameters 176 (or a filter 174) to provide distortion correction such as that due to the lens of the camera 156. The filtered (or cropped) data 192 is stored in memory 170 for further processing.

Particularly, once filtered as shown at 192, the video frames from each feed (each sensor 156) are sequentially analyzed by the flow algorithm 164 to determine traffic sensing data 180, which may include the density of the obstacle/pedestrian traffic in the workspace 110 (or its zones 112) and a set of motion information 184 that may include overall direction of the obstacle/pedestrian traffic 186 and its speed 187 (with this information given for individual obstacles and/or groups of obstacles). In one useful implementation, the flow algorithm/module 164 includes (or takes the form of) the Gunnar Farneback flow algorithm, which is useful for processing the video frames to determine pedestrian/obstacle density 182 and motion information 184. Typically, the flow module 164 is configured to identify objects that are greater than a predefined minimum size as potential obstacles such as pedestrians (e.g., to exclude smaller objects moving in the space such as a bird that may not be considered as an obstacle in some cases) and, in some cases, that are moving faster than a predefined minimum speed (e.g., over a specified noise level to avoid classifying stationary objects as obstacles or objects to include in traffic patterns of moving and/or movable objects/obstacles for a space).

The 2D data 180 is then transformed by the flow module 164 in such a way so as to map it to the 3D world that the robot 130 exists in. As part of this process, the individual 2D data feeds 158 may be correlated by the flow module 164 (or a separate correlation module/routine) into one 3D world space defined by the 3D real world coordinate system 190 for the space 110. In some embodiments, during this correlation process, the position of the camera/sensor 156 and its rotation in space are taken into account to provide the navigation system 100 with traffic data 194 to allow it to choose a most efficient path (or a path fitting other navigation rules 144) to get the autonomous agent 130 to its desired location 143.

Traffic analysis results 165 (e.g., all or portions of the correlated flow data 194 and/or the more raw calculated traffic data 180) are continuously being updated and reported from the traffic analysis unit 150 to the robot 130 for processing by the navigation module 136. Hence, based on real time changes in pedestrian/obstacle traffic on the ground (or in the space 110), the navigation module 136 can adapt the selected route/course 146 (or choose a new one) to suit the present obstacle traffic in the workspace 110. For example, the origin 142 may be updated periodically (e.g., a refresh time in the range of 5 to 60 seconds or the like), and a new selected route 146 selected or generated to provide real time navigation through a space 110 crowded with pedestrians and/or other obstacles moving in varying flow patterns.

Figure 2:
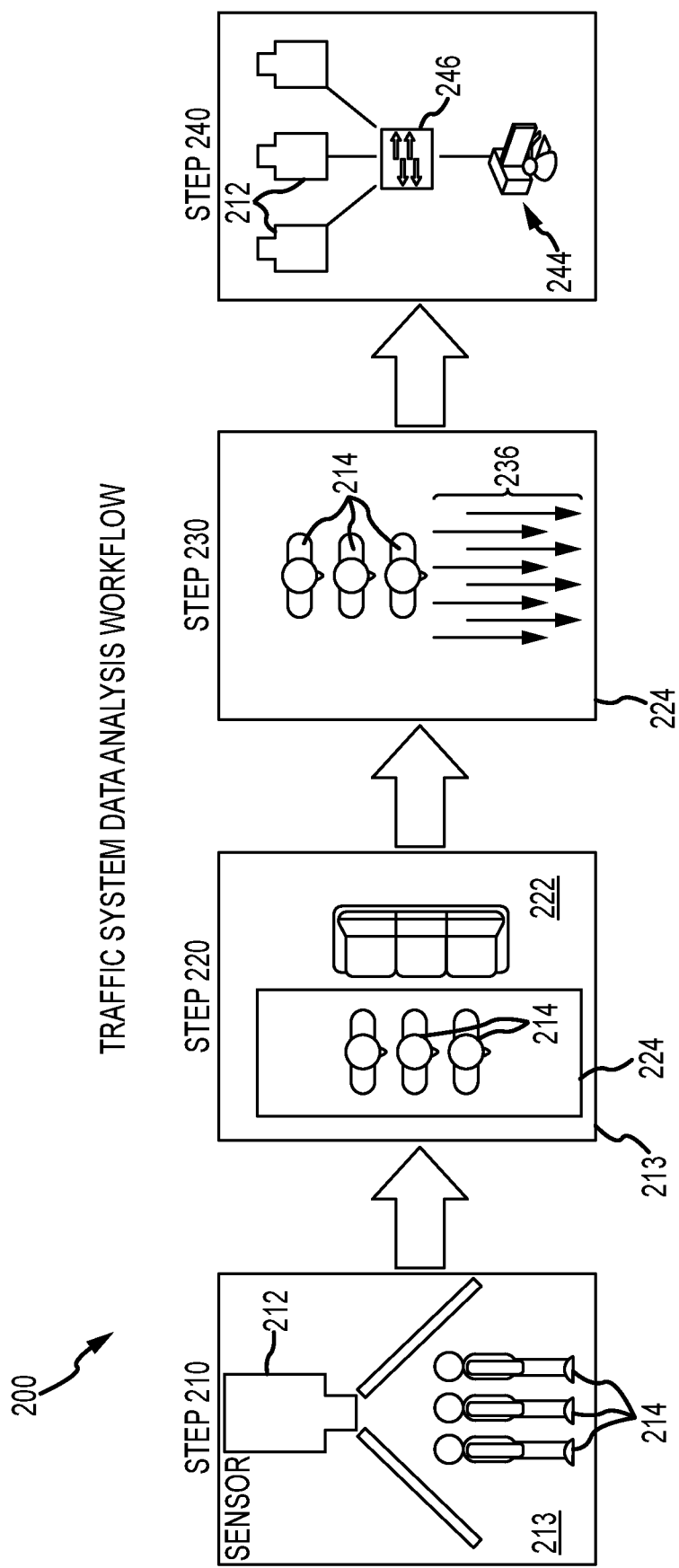
FIG. 2 illustrates a traffic system data analysis workflow such as may occur during operations of the system of FIG. 1.

With the system 100 understood, it may be useful to describe workflow during operations of the traffic system 100 to perform a traffic data analysis. In this example, the obstacles considered in the traffic analysis were pedestrians, but it will be clear that these same concepts can be applied to all types of moving and/or movable objects or obstacles in a particular space or workspace. FIG. 2 illustrates workflow or data flow during a method 200 of analyzing pedestrian traffic as may be carried out with the traffic analysis unit 150 for space 110. In step 210, sensors 212 are placed throughout the navigable areas of interest in a workspace including area 213 in which a number of pedestrians 214 may be located and moving about in one or more traffic patterns. The navigable areas such as area 213 are typically selected because they include pathways/surfaces upon which an autonomous agent such as a mobile robot may travel while the pedestrians 214 are present and, often, using the same pathways/surfaces as they move about the workspace. The sensors 212, in step 210, operate to send their native data streams (e.g., captured video frames) to a processing unit.

The processing unit, in step 220, performs one or more operations on the data streams to correct for lens distortions and to eliminate/crop any unwanted data. This process is partially illustrated in FIG. 2 with data/video frames of the original area/space 213 having a portion 222 cropped out to define a reduced area (or a set of cropped sensor data) 224 in which the pedestrians 214 are located and moving in the workspace. The portion 222 may be cropped out of the sensor data because it is an area that is not navigable by the autonomous agent, e.g., a seating area of the workspace. Hence, the cropped portion 222 is unneeded data for navigation purposes and can be removed to reduce the amount of data that needs to be processed and improve the operations (e.g., increase the speed of processing) of the flow algorithm (and of the traffic analysis unit).

The method 200 continues at 230 with the cropped data feeds being analyzed by the flow algorithm (e.g., software implementing the Gunnar-Farneback optical flow algorithm or the like) to generate traffic data 236 (such as the direction and speed of the group of pedestrians 214 and the density of the pedestrians 214 in the area/zone 224). Weighting and other adjustments may also be applied to the data from step 220 such as to account for sensor placement (e.g., angle, location, and the like for each camera 212). As shown in step 240, the output of the flow algorithm, which has been run on all of the sensor outputs, is sent to a process (e.g., a correlation routine run on computing device 244) that proceeds to correlate the data into the world space (or this correlation may be done by the flow diagram as shown with module 164 in FIG. 1). The combined data 246 is then sent to a path planning system (not shown in FIG. 2 but may take the form of the navigation module 136 of autonomous agent 130 of FIG. 1) to determine which path is optimal for a desired destination or target/goal location in the workspace, and this determination may be made based on one or more navigation rules predefined for the autonomous agent.

Figure 3:
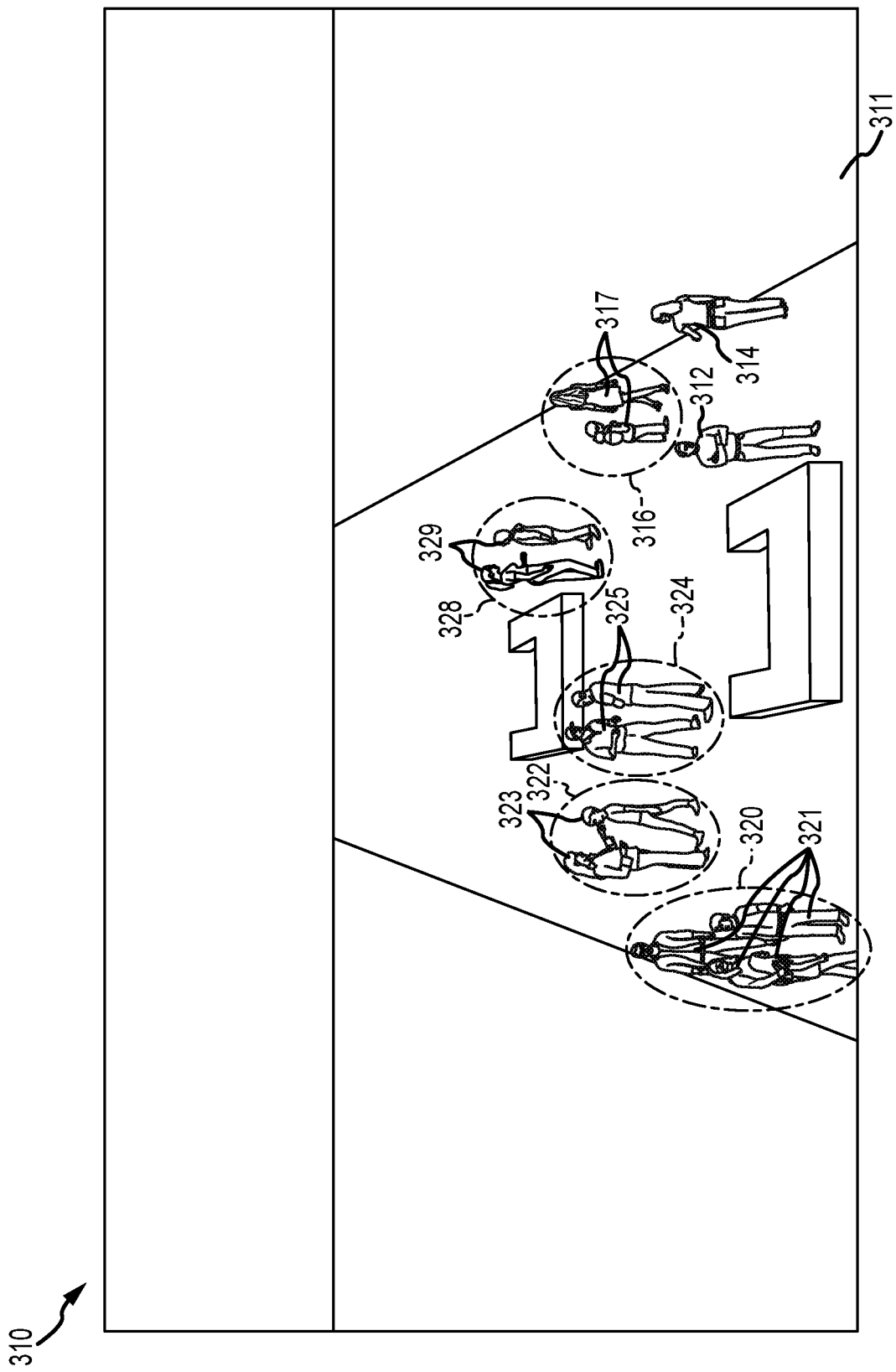
FIG. 3 illustrates a single frame of a video stream as may captured by a sensor/camera used as part of a traffic analysis unit that is positioned in a typical shopping mall.

FIG. 3 illustrates a frame 310 of a video stream (or sensor data) captured by a sensor/camera of traffic analysis unit/assembly, and this frame 310 along with numerous other such frames can be processed as described herein to generate traffic sensing data (as shown at 180 in FIG. 1) including density information and motion information (which may include direction and speed). Such processing of sequential frames such as frame 310 may be performed by a flow algorithm (such as algorithm 164 in FIG. 1) after a reduction in sensor data by a sensor data filtering module (such as module 160 in FIG. 1). The sensor/camera used to capture the frame 310 was positioned in a typical mall environment, which includes a floor or mall space 311 that is generally open for free or unregulated flow of numerous moving obstacles/objects (in this case, only pedestrians are shown as the obstacles but other robots and other moving objects may also be included as "obstacles").

The processing of the video frame 310 (and other sequential frames from the same camera) may include as shown in FIG. 3 the identification of individual moving obstacles and also, in some cases, groups of obstacles to facilitate more efficient traffic processing. As shown, individual obstacles (in the form of pedestrians) 312, 314, and 326 have been identified in the frame 310 (e.g., by software of a traffic analysis unit), and each moving obstacle 312, 314, and 326 is spaced apart (e.g., by more than about 3 feet with obstacles 312, 314 spaced apart about 15 feet and obstacles 314 and 326 spaced apart about 30 feet). This spacing may provide a path for a robot (not shown) to pass through the crowd of moving obstacles on the floor/mall space 311. In this example, each of these pedestrians 312, 314, 326 is generally walking in a common direction but against conventional traffic patterns in many more regulated settings ("walking on the left hand side" of the floor 311 rather than the right hand side), and each may be traveling at their own speed (e.g., three differing speeds, two differing speeds, or the same speed).

In the video frame 310, the processor has also identified the following groups: group 316 with two obstacles/pedestrians 317 in proximity (e.g., less than 3 feet spacing) and moving in the same direction; group 320 with four obstacles/pedestrians 321 (including moving obstacles in the form of baby strollers); group 322 with three obstacles/pedestrians 323; group 324 with two obstacles/pedestrians 325; and group 328 with two obstacles/pedestrians 329. Since flow is unregulated, each of these groups 316, 320, 322, 324, and 328 may be moving in any direction on the floor or mall space 311 and at speeds specific to that group. The processor also can process the frame 310 to provide density data (as part of the traffic data output to an autonomous agent such as a mobile robot or robotic assembly with parts that move in the monitored workspace), and, as shown, the floor/mall space 311 has a higher density of obstacles/pedestrians on the left side than on the right side and includes very low density areas/zones in the center (e.g., between groups 316 and 324 there are no obstacles/pedestrians). Such density information may be very useful as input to a navigation module (such as module 136 in FIG. 1) of a robot as it may be useful to select lower density areas/zones for a route/course through this space (or portion of a mall, in this example) when the route selection rules indicate a route with a shortest travel time be chosen or to select the higher density areas/zones for a route/course when the route selection rules differ (e.g., the purpose of the robot is to interact with and/or entertain the most possible people in the space).

Figure 4:
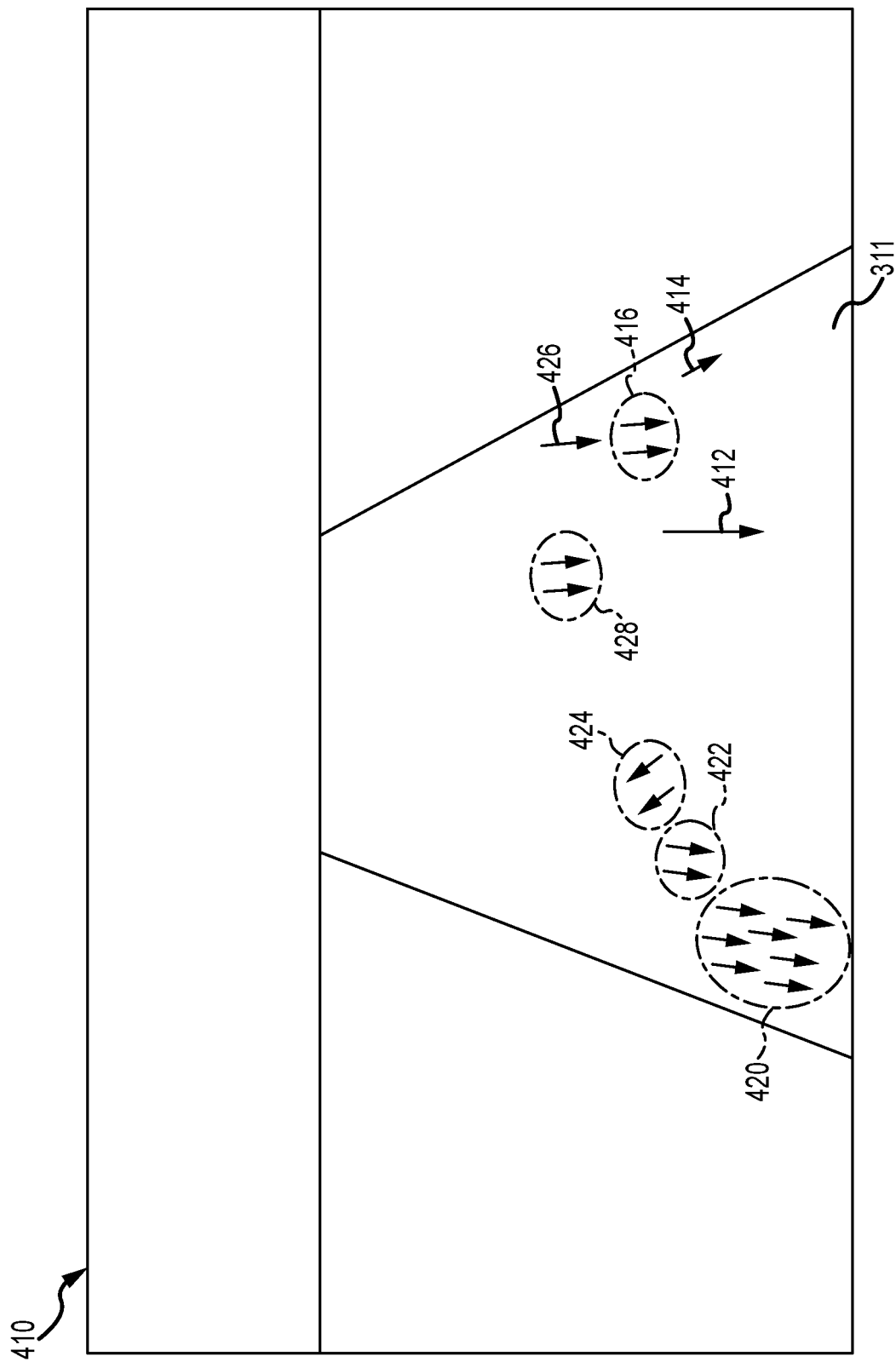
FIG. 4 illustrates a visual representation of a 3D real world space, corresponding with the space of the shopping mall of FIG. 3, that includes an overlay of calculated traffic data that has been correlated to the 3D real world space (e.g., by a traffic analysis unit of the system of FIG. 1)

FIG. 4 illustrates a visual representation 410 of a 3D real world space, corresponding with the workspace of the shopping mall of FIG. 3, that includes an overlay of calculated traffic data that has been correlated to the 3D real world space (e.g., by a traffic analysis unit of the system of FIG. 1). The traffic data in this example is shown visually through the use of directional arrows, and the number of arrows in a space may indicate density, the direction of the arrowhead of each arrow may represent the direction of pedestrian traffic, and the size of the arrow (or its length or both) may represent the speed (with shorter (or smaller) being slower pedestrian speeds and longer (or larger) being faster pedestrian speeds). In other embodiments, differing symbols and/or graphics may be used to visually represent the traffic data in the 3D real world space as shown in image 410, and the representation 410 is mainly suited for use by a human operator, such as when a human operator is inspecting the traffic data or is selecting a route/course (or target navigation location) for an autonomous agent rather than relying upon (or solely upon) a navigation module to make such a decision.

As shown, the image of pedestrian 312 has been replaced with arrow 412, the image of pedestrian 314 has been replaced by arrow 414, and the image of pedestrian 326 has been replaced by arrow 426. The arrows 412, 414, and 426 are positioned in 3D space by correlation of the 2D image 310 to a 3D real world coordinate system (as explained above). Arrows 412 and 426 indicate that the pedestrians 312 and 326 are both moving in a similar direction but at two different speeds, while arrow 414 indicates pedestrian 314 is moving in a different direction and at a slower speed. These speeds and directions (as well as traffic density) are calculated as part of the sensed traffic data by a flow algorithm (as discussed above) via processing of sequential video frames from a camera. Further, as shown, the pedestrian group 316 has been replaced by the set of arrows 416, the pedestrian group 320 has been replaced by the set of arrows 420, the group 322 has been replaced by the set of arrows 422, the group 324 has been replaced by the set of arrows 424, and the group 328 has been replaced by the set of arrows 428. Each of these pedestrian groups may be moving at a single speed and in a single direction as calculated by the flow algorithm, and it can be seen they are moving in two or more directions in the mall space/floor 311 and at two or more speeds as the flow patterns are not regulated.

Figure 5:
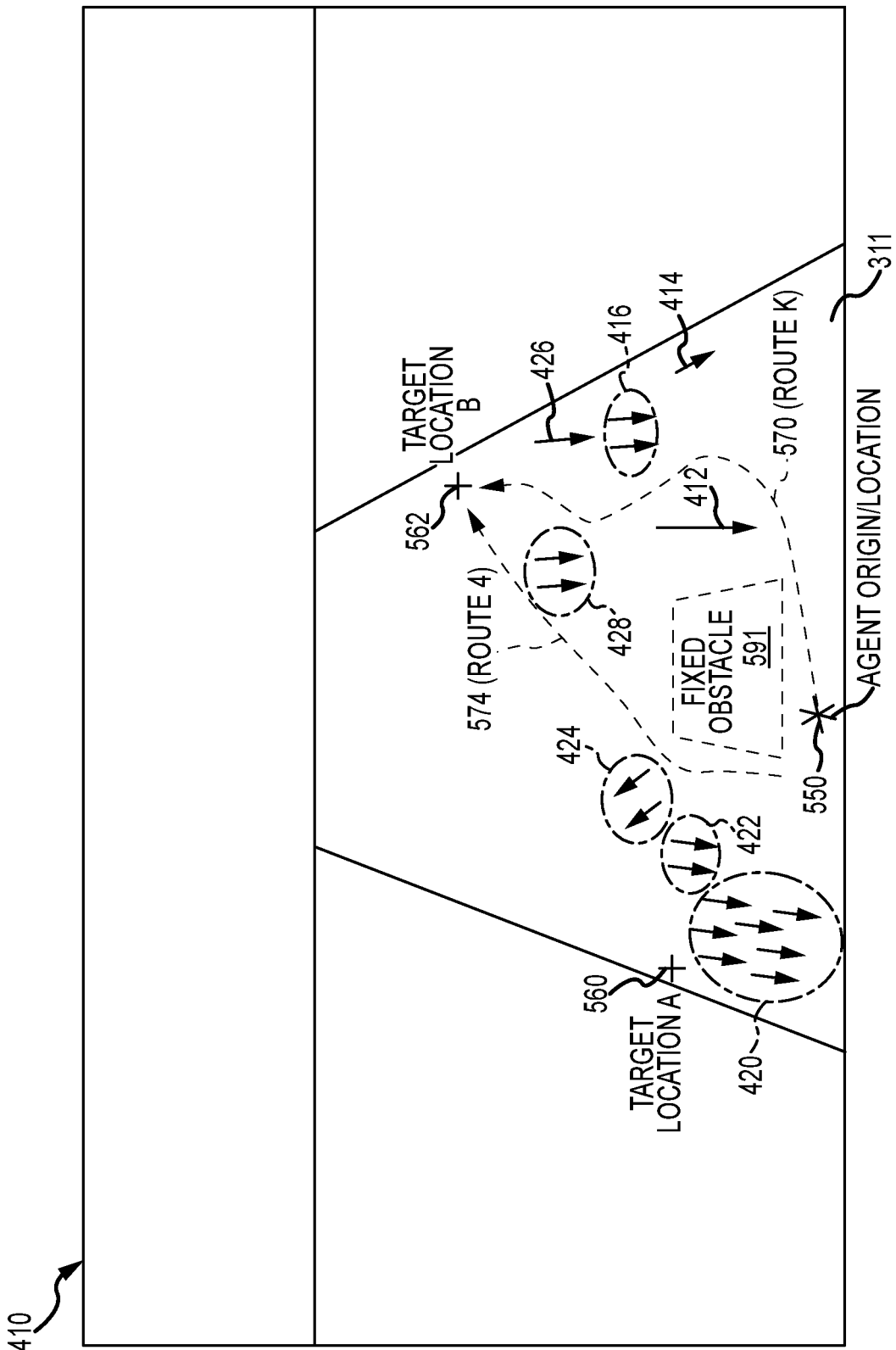
FIG. 5 illustrates the visual representation of the 3D real world space of FIG. 4 with graphics added to represent navigation decision processes as may be carried out by a navigation module of a robot or other autonomous agent using traffic data as input.

Using the traffic data as input (e.g., the traffic data correlated to a 3D space as shown in FIG. 4), a navigation module of an autonomous agent (or a human operator of a robot or other mobile object) can make navigation decisions based on a set of navigation rules for a particular workspace and/or autonomous agent. FIG. 5 illustrates the visual representation 410 of the 3D real world space of FIG. 4 with graphical elements added to represent navigation decision processes as may be carried out by a navigation module of a robot using traffic data as input (but, it should be noted that the navigation module often will not generate such visuals with FIG. 5 being useful for illustrating the underlying processes carried out by the navigation module and not required to implement the invention).

As shown, an autonomous agent (not shown but may be a robot, driverless vehicle, or the like) is presently at a navigational origin or current location 550 in the space 311 (e.g., on the floor of the mall space). The agent has been assigned two target locations 560 and 562 in the space 311 and is following control programs indicating the agent should move to one of the two locations 560, 562 at this time and with the traffic conditions/patterns for moving obstacles determined by the traffic analysis unit and displayed in FIGS. 4 and 5 in space 311. Exemplary route selection rules for the agent presently may be: (1) avoid areas of a workspace that have a density greater than "X" and (2) choose a route or path that results in a shortest travel time. With these navigation rules and the traffic input shown in FIGS. 4 and 5, a navigation module may determine that although the distance between the agent origin and the target location 560 is shorter that this target location should be discarded because the density of pedestrians between the two locations 550, 560 is greater than "X" (and, in this case, because the travel time may also be greater than to target location 562).

Once the navigation module chooses its next target/goal location 562, the navigation module may act to generate one or more courses or routes for traveling between the origin/current location 550 and the chosen target location 562 in the space 311. The navigation module may generate a first route 570 that moves first to the right around a fixed obstacle 571 in the space 311 and then through moving obstacle/object traffic (represented by arrows 412, 414, 426 and sets of arrows 416, 428) to the target location 562. A second route 574 may also be generated that moves to the left around obstacle 571 and then through moving obstacle (e.g., pedestrian) traffic represented by sets of arrows 424, 428 to target location 562. The route 570 may be some distance shorter, but it would likely be discarded as taking longer to travel due to the denser obstacle traffic than route 574 and/or because it requires the agent to travel upstream through traffic (which may be against an additional route selection rule followed by the navigation module). Route 574 travels through much less dense obstacle traffic and also follows or moves in the same direction as the group 324 as shown with the set of arrows 424 (and an additional route selection rule may be to travel in same direction as group and/or individual traffic when possible) and behind group 328 (an additional selection rule may be to avoid crossing travel paths of individual moving obstacles and/or groups of moving obstacles such as groups of people walking or on and/or in vehicles). Hence, the navigation module may choose route 574 to move to the target location, and this selection and/or the route itself may be periodically updated to reflect ongoing changes in the traffic pattern of the moving obstacles in the workspace 311 as reflected in periodically-received traffic data from the traffic analysis unit.

Figure 6:
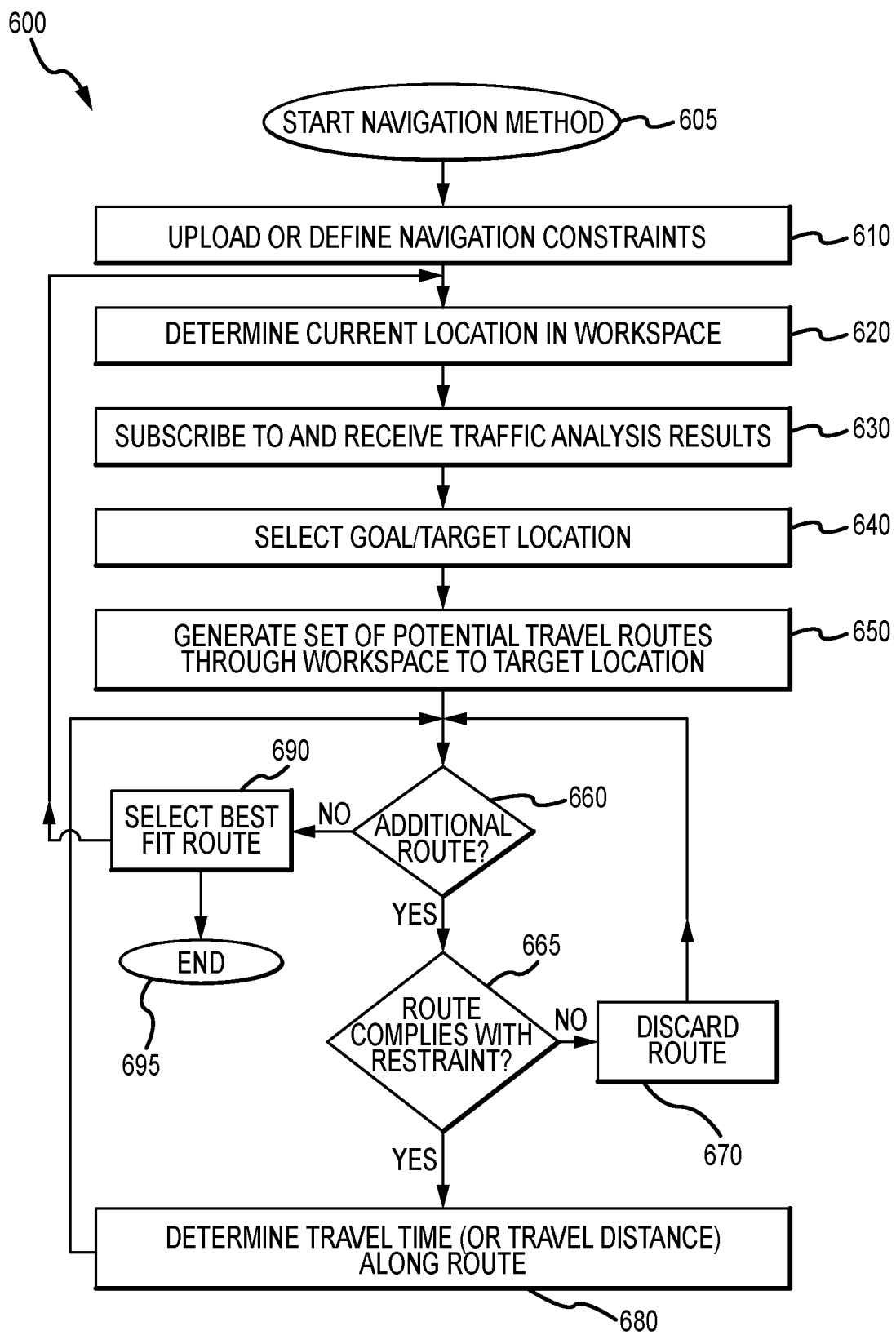
FIG. 6 is a flow diagram of a navigation routine as may be carried out by a navigation module of the present description running onboard or offboard an autonomous agent.

FIG. 6 illustrates a navigation method 600 that may be performed by a navigation module of a robot of the present description. The method 600 starts at 605 such as with establishing communication links between a controller of a robot or other autonomous agent, with modifying the controller's navigation module or motion planner software to make use of traffic data created by a traffic analysis unit taught herein, and designing and implementing a traffic analysis unit (as described herein) for a workspace in which the robot is operating. The method 600 continues at 610 with the robot uploading or defining a set of navigation constraints (or rules such as those used to select a path or a target/goal location) for use in processing with later received traffic analysis results to navigate through the space.

At step 620, the method 600 continues with determining the current location (or origin for generating a travel route) of the robot in the workspace. Then, at 630, the robot subscribes to a data feed to receive traffic analysis results for the space (or this may be performed as part of startup in step 605) and receives a first set of such traffic analysis results from a traffic analysis unit (or another delivery device/service). This data, as discussed above, typically will include the density of moving obstacles in the workspace and also motion information for individual moving obstacles (e.g., people walking/pedestrians, people using vehicles, other robots, and so on) and/or for groups of the moving obstacles in the workspace (and the motion information may include direction and speed for the obstacle and/or group). In some embodiments, the workspace is broken up into two or more areas/zones and the traffic data is categorized and/or provided for each of these areas/zones rather than on the granulated level of individual obstacles and/or groups.

The method 600 continues at 640 with the navigation module receiving or choosing two or more target/goal locations to travel to in the workspace and then determining among these which to use in generating a travel route/path from the current location. The goal/target location may be chosen based on the received traffic analysis results along with the navigation constraints/rules such as by discarding goal/target locations in dense traffic areas or that require travel through densely populated areas (with "too dense" or densely populated being a predefined value suited to the robot and the workspace). Goal/target locations may also be discarded if they require the robot to travel upstream or transverse to traffic flow patterns. Other criteria may also be used during step 640 to assist the navigation module in choosing among potentially acceptable target/goal locations.

With a goal location selected, the method 600 continues at 650 with generating one-to-many potential travel routes through the workspace between the origin location and the selected goal location. These routes may be based on distances and avoiding fixed obstacles, but they may also be generated by the navigation module based on the received traffic analysis results (such as to move with the flow of traffic in various zones of the workspace, to move through less densely populated areas (or the opposite if interaction is desired with pedestrians), and so on). At step 660, the method 600 continues with processing a next one of the generated navigation routes to the selected goal location.

If there is an additional route, the method 600 continues at 665 with determining whether the route complies with the navigation restraints/rules. If not (e.g., requires traveling upstream against the travel direction of a group or the like), the method 600 involves discarding the route at 670 and repeating step 660. If the route complies, the method 600 continues at 680 with determining the travel time (and/or travel distance) for the agent to move along the route to the goal location and then repeating step 660. Once all routes have been processed, step 660 will result in passing the procedure to step 690 where the navigation module acts to select the best fitting route that has not been discarded at step 670. This may involve choosing the route with the shortest travel time, the route with the shortest travel distance, or the route meeting one or more route selection criteria to suit the navigation constraints/rules for the particular autonomous agent and/or workspace. Once the best fitting route is chosen, the controller of the autonomous agent may operate the drive system to cause the agent (e.g., a robot) to follow the route to the goal location. The method 600 may then continue at 620 to provide updates to the route based on newly received traffic analysis results or end at 695.

As discussed above, the traffic sensors may be implemented using digital video cameras that can be positioned in or near a workspace to capture visualization video of the workspace in real time so as to provide a series of images or frames. This series of images/frames is then processed (after cropping and/or other filtering in some cases) by a flow algorithm to generate traffic data. The robot or other autonomous agent can subscribe to a data feed output by the traffic analysis unit (or a server communicating with the analysis unit) so the robot/agent will know the state-of-the-world with regard to pedestrian or other moving obstacle traffic in its workspace (e.g., any travel space in which the robot/agent travels). Then, based on this state-of-the-world and a set of navigation constraints, the robot/agent controller can operate to navigate through the workspace in a more efficient manner to reach travel goal/target locations.

In this manner, the controller (or its navigation module, motion planner, or the like) can provide high level planning of the travel of the robot/agent through the workspace rather than merely reacting to obstacles within its immediate vicinity (detectable by onboard sensors including cameras). The above examples generally implied that the navigation constraints/rules may call for the robot/agent to move most quickly (or along the shortest path) between two locations in the space. However, the robot's/agent's navigation constraints/rules may be designed to achieve other purposes such as to entertain or attract people to change traffic flow or to marshal or guide the flow of people through a space. For example, the traffic analysis results may indicate that there is a congested zone with high density and with slow travel speeds, and the robot/agent may be directed to travel to a less densely populated space nearby in an attempt to encourage the people (e.g., pedestrians) to move away from the congested zone to the space near the robot/agent or to follow the robot/agent along a less traveled pathway through the space.

In many cases, a navigation module of an autonomous agent will be the audience for the traffic analysis results. However, in some embodiments, the system will include another decision making tool that takes the results as input and makes a non-navigation decision based on the traffic data input. The traffic analysis results may also be used by a human operator in making one or more decisions, which may be related to navigating through the workspace (themselves, other people, or mobile agents under the human operator's control). In another example, the traffic analysis results are provided to a mobile application used by pedestrians (e.g., via operation of their smartphone or the like as shown with handheld device 199 operated by pedestrian 120 and receiving traffic analysis results 165) moving through the workspace, and the mobile application may display the data flow (similar to FIG. 4) and/or provide suggested routes to move from a first location to a second location with the shortest travel time or with less interference with pedestrian traffic patterns.

In some embodiments, the traffic analysis unit will also process historical traffic data for the workspace along with the generated traffic data. For example, the analysis unit may function to determine that pedestrian flow through the workspace has changed over time and, in some cases, provide one or more reasons for these changes in flow. In some implementations of the system 100, the traffic analysis results are used to help in effectively staffing the workspace or to run services/businesses in or off the workspace, e.g., by increasing staffing in areas/zones with dense traffic, opening additional services/businesses to attract pedestrians into less densely populated areas of the workspace, and the like.

In some cases, the responses to moving obstacle traffic may be automated such as turning on and off kiosks in or along the workspace in response to detected obstacle (e.g., people) flow in the vicinity of the kiosk (or distal to the kiosk to try to attract people from overcrowded areas). Shopping malls and buildings with elevator banks may use the traffic analysis results to modify operation of the elevators to better suit traffic flow such as by causing some to default to return to congested spaces/floors. Airport terminals could also utilize the traffic analysis results such as with security lines and/or check in lines being monitored and/or other spaces in the terminal (or outside) to determine when to shutdown lines and when to open additional lines and/or decrease/increase staffing of the lines/checkpoints.

Although the invention has been described and illustrated with a certain degree of particularity, the particular implementations described in the present disclosure have been as examples, and numerous changes in the combination and arrangement of parts can be resorted to by those skilled in the art without departing from the spirit and scope of the invention, as claimed.

Previous technologies typically were limited to monitoring traffic, such as vehicles on roads, but this traffic followed predictable paths (vehicles stayed in lanes and went in known directions) with relatively predictable environmental conditions. Other technologies used monitoring devices for retail establishments that gauged customer density within a closed area with predictable pathways (e.g., store aisles), and, when processed, this data guided store management decisions about directing store traffic flow but was not processed into an autonomous agent. No previous technology provided a wholly satisfactory solution to navigating an autonomous agent such as a robot through a space crowded with pedestrians moving freely in multiple directions and, often, without any fixed pathways. For example, no prior technology provided feedforward information to an autonomous agent with directives to alter its navigational course decisions based on this input traffic sensing data. Furthermore, no technology previously existed to do so within an uncontrolled crowd in an open area.

With this technology understood, one skilled in the art will recognize numerous expansions and specific applications that will benefit from its use. As one example, if there is detectable confusion in the traffic pattern (e.g., not discernable regular flow patterns or congestion in certain spaces), context-aware signage or announcements over a speaker system can be triggered to operate to try to aid the obstacles (e.g., people) in moving through the monitored space. In another example, food carts could pull inventory when traffic nearby indicates heavier usage or a traffic pattern is determined by the technology described herein to show that a larger number of people are approaching their location (e.g., a food cart may be instructed to begin cooking/preparing additional food to meet the upcoming demand of approaching people based on detected traffic patterns such as to put more pretzels, pizzas, and so on in the oven). In some cases, traffic may be controlled or serviced in response to detected traffic patterns such as to adjust directions of moving walkways, escalators, and the like. In another use example for the technology, lighting levels in a space could be automatically adjusted in response to detected traffic patterns in a space of obstacles (including people in most cases) to allow for better visibility during crowded conditions.

We claim:

1. A method for reporting remote traffic conditions to off-board operational assets in a facility using a mobile autonomous agent, comprising:

navigating a mobile autonomous agent along a navigation route in a facility, wherein the navigation route is proximate to a number of moving or movable obstacles in the facility;

at two or more locations along the navigation route, using a traffic sensor onboard the mobile autonomous agent to sense movement of the obstacles in the facility and, in response, generate sensor output;

generating a traffic analysis from the sensor output, wherein the traffic analysis includes density values for the obstacles in the facility and motion information for the obstacles in the facility;

communicating the traffic analysis from the two or more locations from the mobile autonomous agent to an off-board operational asset in the facility; and modifying at least one operation of the off-board operational asset based on the traffic analysis, wherein the off-board operational asset is located at a fixed location in the facility that is remote from the two or more locations, wherein the at least one modified operation comprises modifying operation of one or more people-moving machines in the facility based on anticipated traffic implied by the traffic analysis, and wherein the people-moving machines are selected from the group consisting of elevators, moving walkways, and escalators.

2. The method of claim 1, wherein the at least one modified operation comprises modifying staffing at or near the fixed location based on anticipated traffic implied by the traffic analysis.

3. The method of claim 1, wherein the at least one modified operation comprises opening additional services or closing services at or near the fixed location based on anticipated traffic implied by the traffic analysis.

4. The method of claim 1, wherein the at least one modified operation comprises activating a kiosk in a space proximate to guests in the facility to alter traffic reported by the traffic analysis.

5. The method of claim 1, wherein the off-board operational asset comprises a mobile handheld device operated by a guest of the facility and the at least one modified operation comprises modifying a navigation operation directing the guest, using the mobile handheld device, to navigate within the facility.

6. The method of claim 1, wherein the facility is configured such that the obstacles have unregulated flow patterns in at least one area of the space and the navigation route passes through the facility between the two or more locations.

7. The method of claim 1, wherein the mobile autonomous agent comprises a mobile robot or driverless vehicle in wireless communications with the off-board operational asset to periodically communicate the traffic analysis.

8. The method of claim 1, wherein the motion information comprises direction and speed of individual ones of the obstacles or of groups of the obstacles.

9. The method of claim 1, wherein the act of generating a traffic analysis comprises processing the sensor output to generate the traffic analysis using the Gunnar-Farneback optical flow algorithm.

10. The method of claim 1, wherein the act of generating a traffic analysis comprises filtering traffic data to crop out subsets of the sensor output to remove data irrelevant to operation of the off-board operational asset.

11. A system for communicating traffic analysis in a space with a plurality of obstacles, the space being configured such that the obstacles have unregulated flow patterns in at least one area of the space, comprising:
  a mobile traffic analysis unit moving between at least two locations and including an onboard digital camera capturing a sequence of video frames of the space from the at least two locations, the sequence of video frames including the obstacles, wherein the mobile traffic analysis unit further includes a flow module processing the sequence of video frames to generate traffic analysis results including motion information for the obstacles in the space;
  a fixed-location operational asset communicating with the mobile traffic analysis unit to receive the traffic analysis results, wherein at least one operation of the fixed-location operational asset is modified based on the traffic analysis results,
  wherein the mobile traffic analysis unit comprises a mobile robot or driverless vehicle in wireless communications with the fixed-location operational asset to communicate the traffic analysis results from the at least two locations,
  wherein the fixed-location operational asset is located at a location in the space that is remote from the at least two locations,
  wherein the at least one operation comprises operation of one or more people-moving machines in the facility based on anticipated traffic implied by the traffic analysis results, and
  wherein the people-moving machines are selected from the group consisting of elevators, moving walkways, and escalators.

12. The system of claim 11, wherein the mobile traffic analysis unit further comprises a traffic data filtering module run by a processor to crop out subsets of each of the video frames to remove data associated with areas of the space without navigable pathways for the mobile traffic analysis unit or to correct for lens positioning in the space and distortion and further wherein the motion information comprises direction and speed of groups of the obstacles.

13. The system of claim 11, wherein the mobile traffic analysis unit processes the sequence of video frames to generate the traffic analysis results using the Gunnar-Farneback optical flow algorithm.

14. A method for reporting remote traffic conditions to off-board operational assets in a facility, comprising:
  at two or more locations in the facility, using a traffic sensor onboard a mobile agent moving within the facility to sense movement of obstacles in the facility and, in response, generate sensor output;
  generating a traffic analysis from the sensor output, wherein the traffic analysis includes density values for the obstacles in the facility and motion information for the obstacles in the facility;
  communicating the traffic analysis pertaining to the two or more locations to an operational asset in the facility; and
  modifying at least one operation of the operational asset based on the traffic analysis,
  wherein the operational asset is located at a location in the space that is remote from the obstacles,
  wherein the at least one operation comprises modifying operation of one or more people-moving machines in the facility based the density values or the motion information for the obstacles included in the traffic analysis, and
  wherein the people-moving machines are selected from the group consisting of elevators, moving walkways, and escalators.

15. The method of claim 14, wherein the operational asset is located at a fixed location in the facility that is remote from the two or more locations.

16. The method of claim 15, wherein the at least one modified operation further comprises at least one of: modifying staffing at or near the fixed location based on anticipated traffic implied by the traffic analysis; opening additional services or closing services at or near the fixed location based on anticipated traffic implied by the traffic analysis; and activating a kiosk in a space proximate to guests in the facility to alter traffic reported by the traffic analysis.

17. The method of claim 14, wherein the operational asset comprises a mobile handheld device operated by a guest of the facility and the at least one modified operation comprises modifying a navigation operation directing the guest, using the mobile handheld device, to navigate within the facility.

* * * * *